United States Patent
Wu et al.

(10) Patent No.: US 7,169,326 B2
(45) Date of Patent: *Jan. 30, 2007

(54) FLUORESCENT MATERIAL OF TERBIUM ALUMINUM GARNET AND PRODUCING METHODS THEREFOR

(75) Inventors: Jui-Kung Wu, Kaohsiung Hsien (TW); Tai-Yu Chen, Kaohsiung Hsien (TW); Chao-Lung Huang, Kaohsiung Hsien (TW); Chao-Yuan Cheng, Tainan Hsien (TW)

(73) Assignee: South Epitaxy Corporation, Sinshih Township, Tainan County (TW)

( * ) Notice: Subject to any disclaimer, the term of this patent is extended or adjusted under 35 U.S.C. 154(b) by 10 days.

This patent is subject to a terminal disclaimer.

(21) Appl. No.: 10/761,384

(22) Filed: Jan. 22, 2004

(65) Prior Publication Data

US 2004/0188655 A1    Sep. 30, 2004

(30) Foreign Application Priority Data

Mar. 28, 2003  (TW) .............................. 92107350 A

(51) Int. Cl.
*C09K 11/79* (2006.01)
*C09K 11/80* (2006.01)

(52) U.S. Cl. .................. 252/301.4 F; 252/301.4 R
(58) Field of Classification Search ........ 252/301.4 R
See application file for complete search history.

(56) References Cited

U.S. PATENT DOCUMENTS 6,552,487 B1 * 4/2003 Ellens et al. ................ 313/503
6,596,195 B2 * 7/2003 Srivastava et al. ..... 252/301.4 R
6,669,866 B1 * 12/2003 Kummer et al. ...... 252/301.4 R
6,765,237 B1 * 7/2004 Doxsee et al. ................ 257/98

FOREIGN PATENT DOCUMENTS

| JP | 74(49)-3631 | * | 1/1974 |
| TW | 447148 | | 7/2001 |
| TW | 461125 | | 10/2001 |
| TW | 472401 | | 1/2002 |
| TW | 480744 | | 3/2002 |
| TW | 490863 | | 6/2002 |
| TW | 492579 | | 6/2002 |

* cited by examiner

*Primary Examiner*—C. Melissa Koslow
(74) *Attorney, Agent, or Firm*—Birch, Stewart, Kolasch & Birch, LLP

(57) ABSTRACT

A fluorescent material of terbium aluminum garnet has a formula $(Tb_{3-x-y}Ce_xRe_y)(Al_{5-z}O_{12}Me_z)$, wherein $0<x\leq0.8$, $0<y\leq2.0$, $0<z\leq1.0$, wherein Re is at least one of gadolinium (Gd), rubidium (Rb), thulium (Tm), praseodymium (Pr), samarium (Sm), europium (Eu), dysprosium (Dy), holmium (Ho), erbium (Er), ytterbium (Yb), lutetium (Lu), strontium (Sr), yttrium (Y), vanadium (V), and chromium (Cr), and wherein Me is silicone that is added or substituted. A blue light-emitting diode may be used as an exciting light source for exciting the fluorescent material to generate an excited light. The excited light and the exciting light are mixed to generate a pure white light. The fluorescent material may be produced by a solid reaction method, a combustion method, or a synchronous precipitation method.

2 Claims, 6 Drawing Sheets

FLUORESCENT MATERIAL OF TERBIUM ALUMINUM GARNET AND PRODUCING METHODS THEREFOR

This Nonprovisional application claims priority under 35 U.S.C. § 119(a) on patent application Ser. No. 092107350 filed in TAIWAN, R.O.C. on Mar. 28, 2003, the entire contents of which are hereby incorporated by reference.

BACKGROUND OF THE INVENTION

1. Field of the Invention

The present invention relates to a fluorescent material of terbium aluminum garnet and producing methods therefor.

2. Description of Related Art

A typical white light-emitting diode (LED) includes a fluorescent material (or fluorescent agent, fluorescent gel, or phosphorescent layer) and an exciting light source. The exciting light source is a diode (such as a blue light-emitting diode) that emits an exciting light of an appropriate wavelength. The fluorescent material, when excited by the exciting light emitted by the exciting light source, emits an excited light of another color. The excited light and the exciting light emitted by the exciting light source mix with each other to generate a visible white light.

The fluorescent material is generally selected from crystalline compounds (or lattice of matrix crystal), such as terbium aluminum garnet (TAG, $Tb_3Al_5O_{12}$). The TAG is usually used in applications of magneto-optical materials. Magneto-optical materials are optical information materials that have a magneto-optical effect in both the ultraviolet band and the infrared band. Utilizing magneto-optical characteristics of these materials as well as interaction and conversion between optics, electricity, and magnetism, these materials are processed to form magneto-optical devices providing optical modulation, optical isolation, optical illumination, optical inversion, optical information processing, and other optical/electrical/magnetic conversion.

Further, rare earth elements or other elements such as cerium (Ce), praseodymium (Pr), samarium (Sm), europium (Eu), gadolinium (Gd), dysprosium (Dy), holmium (Ho), erbium (Er), ytterbium (Yb), lutetium (Lu), strontium (Sr), yttrium (Y), vanadium (V), or chromium (Cr) can be added into the TAG to produce $Tb_3Al_5O_{12}:Ce^{3+}$ that includes an active center capable of transforming optical energy. Thus, the fluorescent materials when excited by an exciting light from an exciting light source, emits an excited light. The excited light and the exciting light mix with each other to generate a visible white light.

Although the fluorescent material of $Tb_3Al_5O_{12}:Ce^{3+}$ is widely used in manufacture of white light-emitting diodes, the brightness and the color evenness of the white light thus generated are unsatisfactory. In an attempt to overcome the above problems, the amount of cerium in the fluorescent materials can be adjusted, or the concentration and ingredients of the light-emitting center can be altered. However, adjustment and improvement in the brightness and color evenness are still very difficult, as there are many optional additives in the fluorescent material and as the chromatic coordinate of the fluorescent material covers a wide range.

OBJECTS OF THE INVENTION

An object of the present invention is to provide a fluorescent material of terbium aluminum garnet having a formula $(Tb_{3-x-y}Ce_xRe_y)(Al_{5-z}O_{12}Me_z)$, wherein $0<x\leq0.8$, $0<y\leq2.0$, $0<z\leq1.0$, wherein Re is preferably gadolinium (Gd). Nevertheless, Re can be at least one of gadolinium (Gd), rubidium (Rb), thulium (Tm), praseodymium (Pr), samarium (Sm), europium (Eu), dysprosium (Dy), holmium (Ho), erbium (Er), ytterbium (Yb), lutetium (Lu), strontium (Sr), yttrium (Y), vanadium (V), and chromium (Cr), and wherein Me is silicone that is added or substituted. A blue light-emitting diode may be used as an exciting light source for exciting the fluorescent material to generate an excited light. The excited light and the exciting light are mixed to generate a pure white light. The brightness and color evenness of a white light-emitting diode made from the fluorescent material in accordance with the present invention are improved in comparison to those of a conventional white light-emitting diode using a fluorescent material into which only cerium is added. Further, the chromatic coordinate of the fluorescent material in accordance with the present invention can be adjusted.

Another object of the present invention is to provide a solid reaction method for producing such a fluorescent material.

A further object of the present invention is to provide a combustion method for producing such a fluorescent material.

Still another object of the present invention is to provide a synchronous precipitation method for producing such a fluorescent material.

SUMMARY OF THE INVENTION

To achieve the aforementioned objects, the present invention provides a fluorescent material of terbium aluminum garnet having a formula $(Tb_{3-x-y}Ce_xRe_y)$ $(Al_{5-z}O_{12}Me_z)$, wherein $0<x\leq0.8$, $0<y\leq2.0$, $0<z\leq1.0$, wherein Re is preferably gadolinium (Gd). Nevertheless, Re can be at least one of gadolinium (Gd), rubidium (Rb), thulium (Tm), praseodymium (Pr), samarium (Sm), europium (Eu), dysprosium (Dy), holmium (Ho), erbium (Er), ytterbium (Yb), lutetium (Lu), strontium (Sr), yttrium (Y), vanadium (V), and chromium (Cr), and wherein Me is silicone that is added or substituted. A blue light-emitting diode may be used as an exciting light source for exciting the fluorescent material to generate an excited light. The excited light and the exciting light are mixed to generate a pure white light.

A solid reaction method for producing the fluorescent material in accordance with the present invention comprises the steps of mixing, metal compounds of terbium, aluminum, cerium, and Re; grinding the mixture of metal compounds of terbium, aluminum, cerium, and Re; calcinating the mixture; sintering the mixture after calcination; and grinding the mixture after sintering.

A combustion method for producing the fluorescent material in accordance with the present invention comprises the steps of mixing metal compounds of terbium, aluminum, cerium, and Re; dissolving the mixture of metal compounds of terbium, aluminum, cerium, and Re; heating the dissolved mixture; chelating the heated mixture; heating the mixture after chelation; sintering the chelated mixture after heating; and grinding the mixture after sintering.

A synchronous precipitation method for producing the fluorescent material in accordance with the present invention comprises the steps of mixing metal compounds of terbium, aluminum, cerium, and Re; dissolving the mixture of metal compounds of terbium, aluminum, cerium, and Re; basifying the dissolved mixture; stirring the basified mixture; heating the mixture after stirring; calcinating the mixture after heating; sintering the mixture after calcination; and grinding the mixture after sintering.

Other objects, advantages and novel features of this invention will become more apparent from the following detailed description when taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The fluorescent material in accordance with the present invention is of a formula $(Tb_{3-x-y}Ce_xRe_y)Al_5O_{12}$, wherein $0<x\leq0.8$, and $0<y\leq2.0$, and wherein Re is preferably gadolinium (Gd). Nevertheless, Re can be at least one of rare earth elements or other suitable metals; namely, Re is at least one of gadolinium (Gd), rubidium (Rb), thulium (Tm), praseodymium (Pr), samarium (Sm), europium (Eu), dysprosium (Dy), holmium (Ho), erbium (Er), ytterbium (Yb), lutetium (Lu), strontium (Sr), yttrium (Y), vanadium (V), and chromium (Cr). Re acts as an activator and a co-activator.

Further, the fluorescent material in accordance with the present invention may be of a formula $(Tb_{3-x-y}Ce_xRe_y)(Al_{5-z}O_{12}Me_z)$, wherein $0<x\leq0.8$, $0<y\leq2.0$, $0<z\leq1.0$, and wherein Me is silicon that is added or substituted.

The purity, homogeneity, and particle size of the fluorescent material in accordance with the present invention can be optimized through appropriate control of the processing or change of the manufacturing methods.

Figure 4:
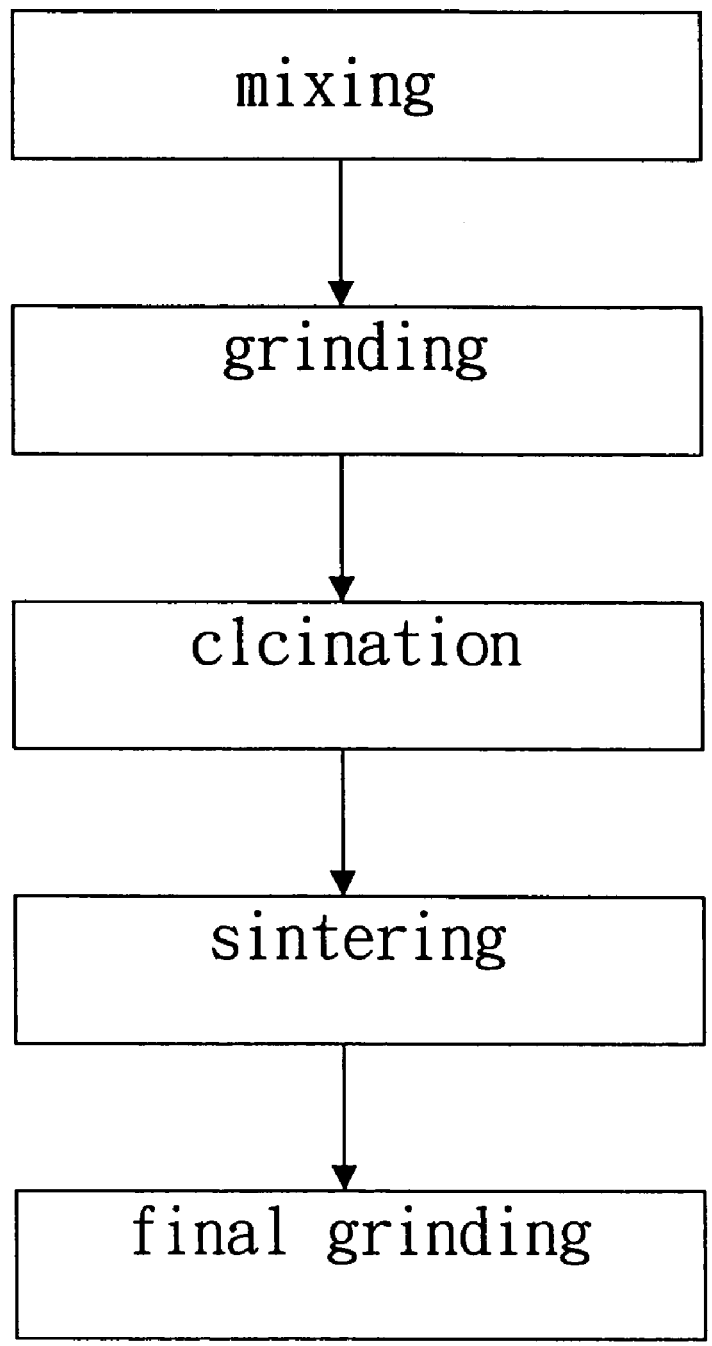
FIG. 4 is a block diagram illustrating a first method for producing the fluorescent material in accordance with the present invention.

FIG. 4 is a block diagram illustrating a first method for producing the fluorescent material in accordance with the present invention, wherein the fluorescent material is produced by a solid reaction method. A first step of the solid reaction method is preparing and grinding terbium nitrate $(Tb(NO_3)_3.6H_2O)$ of 3.0 g, aluminum nitrate $(Al(NO_3)_3.9H_2O)$ of 4.696 g, cerium nitrate $(Ce(NO_3)_3.5H_2O)$ of 0.0469 g, and gadolinium oxide $(Gd_2O_3)$ of 0.1815 g according to stoichiometric ratio to obtain a mixture.

A second step of the solid reaction method is placing the mixture into a crucible and heating the mixture to 1000° C. at a heating rate of 5° C./min for proceeding with calcination for 12 hours. The mixture is then cooled to room temperature at a cooling rate of 5° C./min. Powders are thus obtained after calcination.

A third step of the solid reaction method is grinding the powders obtained after calcination, and the grinded powders are placed into a crucible and sintered at 1200° C. for 12 hours. The heating rate for sintering is 5° C./min.

A fourth step of the solid reaction method is placing the powders after sintering in a reduction gas $H_2/N_2$ (8%:92%) to proceed with reduction at 1200° C. for 12 hours. The $Ce^{4+}$ in the sample is reduced to $Ce^{3+}$ to thereby increase the brightness thereof. Nevertheless, this step can be omitted according to the product need.

A fifth step of the solid reaction method is cooling the powders obtained in the fourth step to room temperature to obtain fluorescent powders (i.e., the fluorescent material of a formula of $(Tb_{2.755}Ce_{0.045}Gd_{0.2})Al_5O_{12}$). The fluorescent powders are grinded, and a photoluminescence spectrometer is used to examine the lighting characteristics of the fluorescent powders.

Figure 5:
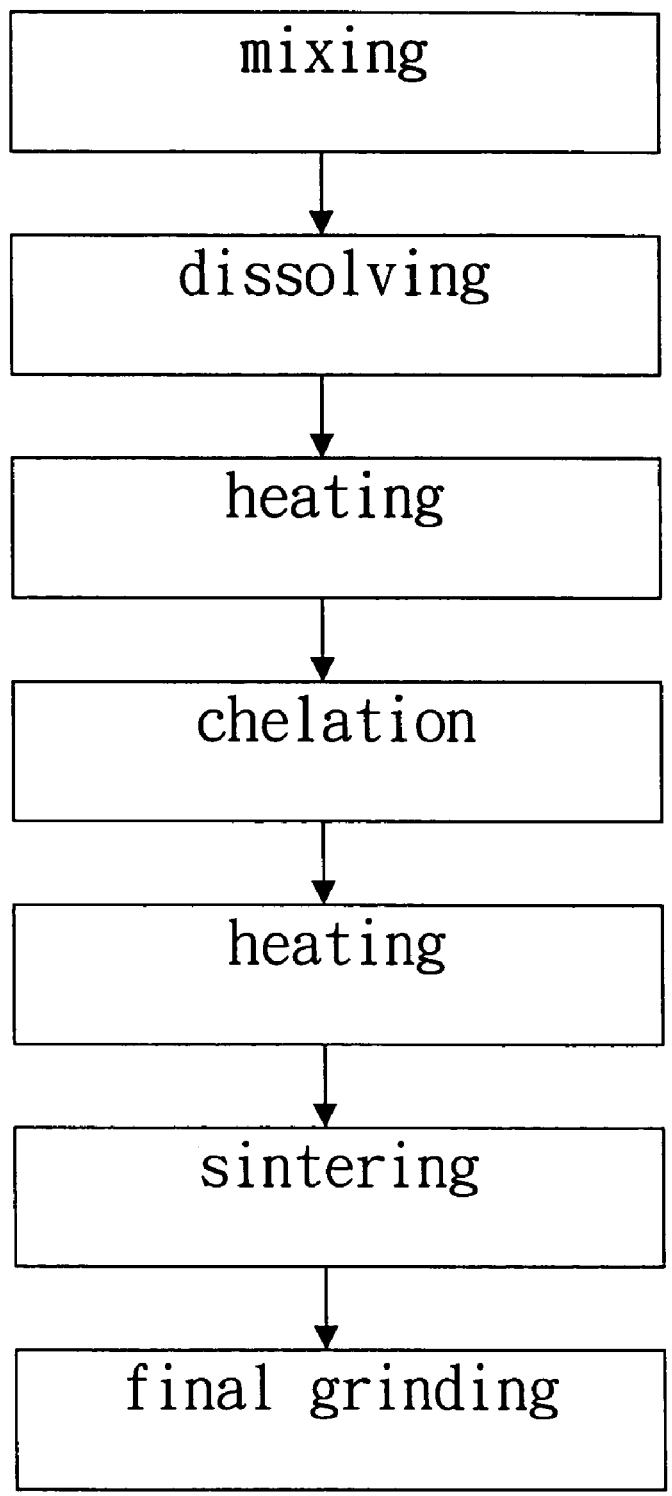
FIG. 5 is a block diagram illustrating a second method for producing the fluorescent material in accordance with the present invention.

FIG. 5 is a block diagram illustrating a second method for producing the fluorescent material in accordance with the present invention, wherein the fluorescent material is produced by a combustion method.

A first step of the combustion method is preparing terbium nitrate $(Tb(NO_3)_3.6H_2O)$ of 3.0 g, aluminum nitrate $(Al(NO_3)_3.9H_2O)$ of 4.696 g, cerium nitrate $(Ce(NO_3)_3.5H_2O)$ of 0.0469 g, and gadolinium oxide $(Gd_2O_3)$ of 0.1815 g according to stoichiometric ratio. The metal salts are mixed, and the mixture is dissolved in di-deionized water to obtain a water solution.

A second step of the combustion method is heating the water solution at 1000° C.–1200° C. to obtain a viscous liquid.

A third step of the combustion method is adding a chelating agent into the viscous liquid and evenly mixing them by oscillation. A gel is thus obtained after cooling. The chelating agent is, e.g., urea or ammonium oxalate having a mole number of metal ions that is 1.4 times of that of the viscous liquid.

A fourth step of the combustion method is heating and thus decomposing the gel at 600° C. The urea or ammonium oxalate is decomposed and releases inflammable gas and reducible gas. A foam-like loose substance is thus obtained. The loose substance usually contains crystal phase.

A fifth step of the combustion method is grinding the loose substance, and the grinded loose substance are placed into a crucible and sintered at 1200° C. for 12 hours. The heating rate for sintering is 5° C./min.

A sixth step of the combustion method is placing the powders after sintering in a reduction gas $H_2/N_2$ (8%:92%) to proceed with reduction at 1200° C. for 12 hours. The $Ce^{4+}$ in the sample is reduced to $Ce^{3+}$ to thereby increase the brightness thereof. Nevertheless, this step can be omitted according to the product need.

A seventh step of the combustion method is cooling the powders obtained in the sixth step to room temperature to obtain fluorescent powders (i.e., the fluorescent material of a formula of $(Tb_{2.755}Ce_{0.045}Gd_{0.2})Al_5O_{12}$). The fluorescent powders are grinded, and a photoluminescence spectrometer is used to examine the lighting characteristics of the fluorescent powders.

Figure 6:
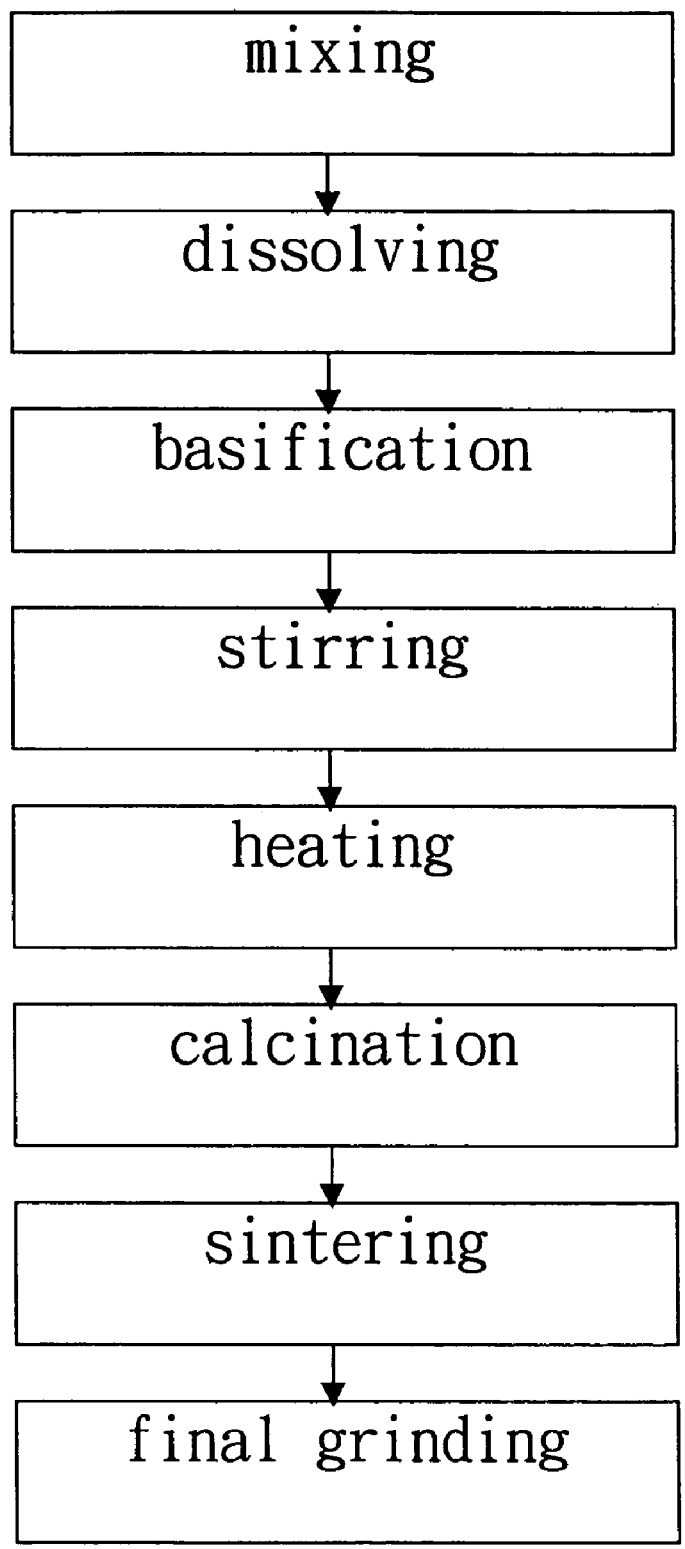
FIG. 6 is a block diagram illustrating a third method for producing the fluorescent material in accordance with the present invention.

FIG. 6 is a block diagram illustrating a third method for producing the fluorescent material in accordance with the present invention, wherein the fluorescent material is produced by a synchronous precipitation method. A first step of the synchronous precipitation method is preparing terbium nitrate $(Tb(NO_3)_3.6H_2O)$ of 3.0 g, aluminum nitrate $(Al(NO_3)_3.9H_2O)$ of 4.696 g, cerium nitrate $(Ce(NO_3)_3.5H_2O)$ of 0.0469 g, and gadolinium oxide $(Gd_2O_3)$ of 0.1815 g according to stoichiometric ratio. The metal salts are mixed, and the mixture is dissolved in di-deionized water to obtain a water solution.

A second step of the synchronous precipitation method is adding alkaline substance such as ethylene diamine into the water solution of metal ion chelate to thereby adjust the pH value of the water solution to be not less than 10 (i.e., basification).

A third step of the synchronous precipitation method is stirring the water solution to form a gel solution and obtaining white gel by means of suction filtration.

A fourth step of the synchronous precipitation method is heating the white gel at 400° C. to decompose most part of organic materials and a part of nitrogen oxide. A black brown powder-like material is thus obtained.

A fifth step of the synchronous precipitation method is placing the powder-like material into a crucible and heating the powder-like material to 1000° C. at a heating rate of 5° C./min for proceeding with calcination for 12 hours. The mixture is then cooled to room temperature at a cooling rate of 5° C./min.

A sixth step of the synchronous precipitation method is grinding the powders after calcination, and the grinded powders are placed into a crucible and sintered at 1200° C. for 12 hours. The heating rate for sintering is 5° C./min.

A seventh step of the synchronous precipitation method is placing the powders after sintering in a reduction gas $H_2/N_2$ (8%:92%) to proceed with reduction at 1200° C. for 12 hours. The $Ce^{4+}$ in the sample is reduced to $Ce^{3+}$ to thereby increase the brightness thereof. Nevertheless, this step can be omitted according to the product need.

An eighth step of the synchronous precipitation method is cooling the reduced powders obtained in the seventh step to room temperature to obtain fluorescent powders (i.e., the fluorescent material of a formula $(Tb_{2.755}Ce_{0.045}Gd_{0.2})Al_5O_{12}$). The fluorescent powders are grinded, and a photoluminescence spectrometer is used to examine the lighting characteristics of the fluorescent powders.

The raw materials (i.e., the metal compounds) for the first step of each of the first method, the second method, and the third method can be replaced with oxides, nitrates, organic metal compounds, and metal salts of the metal used, or the combinations thereof. The chelating agent in the form of chelate compound of ammonium salts of metal in the second method is an organic compound that may be decomposed and release inflammable gas and reducible gas when heated. The alkaline substance in the third method is an alkaline organic compound that may react with the metal ion chelate to form a gel.

Analysis of Characteristics of the Fluorescent Material

Figure 1:
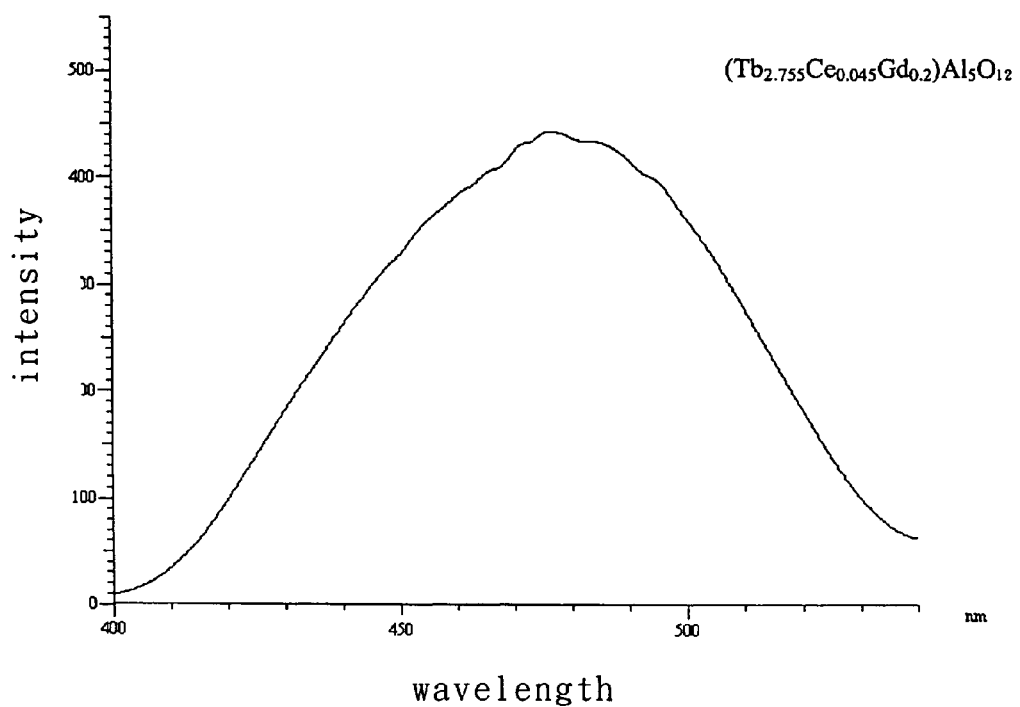
FIG. 1 is an exciting spectrum of a fluorescent material of $(Tb_{2.755}Ce_{0.045}Gd_{0.2})Al_5O_{12}$ in accordance with the present invention excited by a light source with wavelength 549.8 nm.

In accordance with the present invention, cerium, gadolinium, and/or silicone are added into the lattice of matrix crystal of the TAG to produce a fluorescent material that is suitable for manufacture of light-emitting diodes. The optical characteristics of the fluorescent material are examined by a photoluminescence spectrometer, thereby finding out the wavelength of the optical exciting light through examination of the exciting spectrum. The TAG having a formula $(Tb_{2.755}Ce_{0.045}Gd_{0.2})Al_5O_{12}$) (or $(Tb_{3-x-y}Ce_xGd_y)Al_{5-z}O_{12}Me_z$) produced by the synchronous precipitation method is examined by a light source with wavelength 549.8 nm to find out the wavelength of the optimal exciting light. As illustrated in FIG. 1, the optimal exciting light is an exciting light with wavelength between 430 nm and 490 nm, particularly 470 nm.

Figure 2:
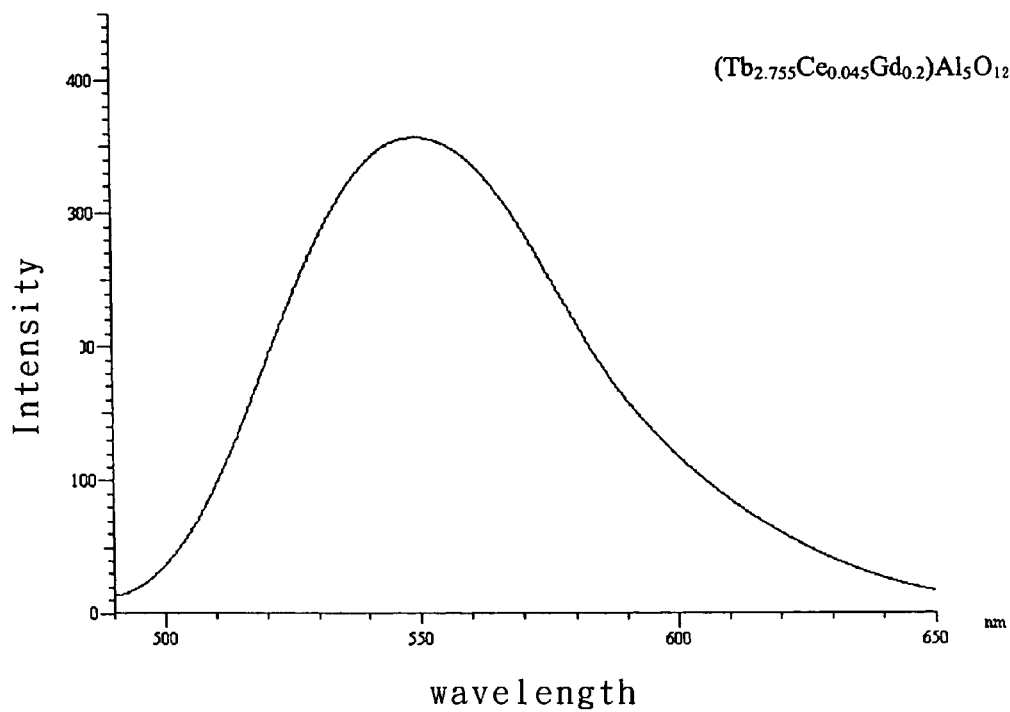
FIG. 2 is an exciting spectrum of a fluorescent material of $(Tb_{2.755}Ce_{0.045}Gd_{0.2})Al_5O_{12}$ in accordance with the present invention excited by an exciting light source with wavelength 470 nm.

As illustrated in FIG. 2, when the TAG in accordance with the present invention having two optical active centers are excited by a blue exciting light with wavelength between 470 nm and 490 nm, an excited light having a color between yellow and orange and with wavelength of 520 nm–590 nm is excited.

Figure 3:
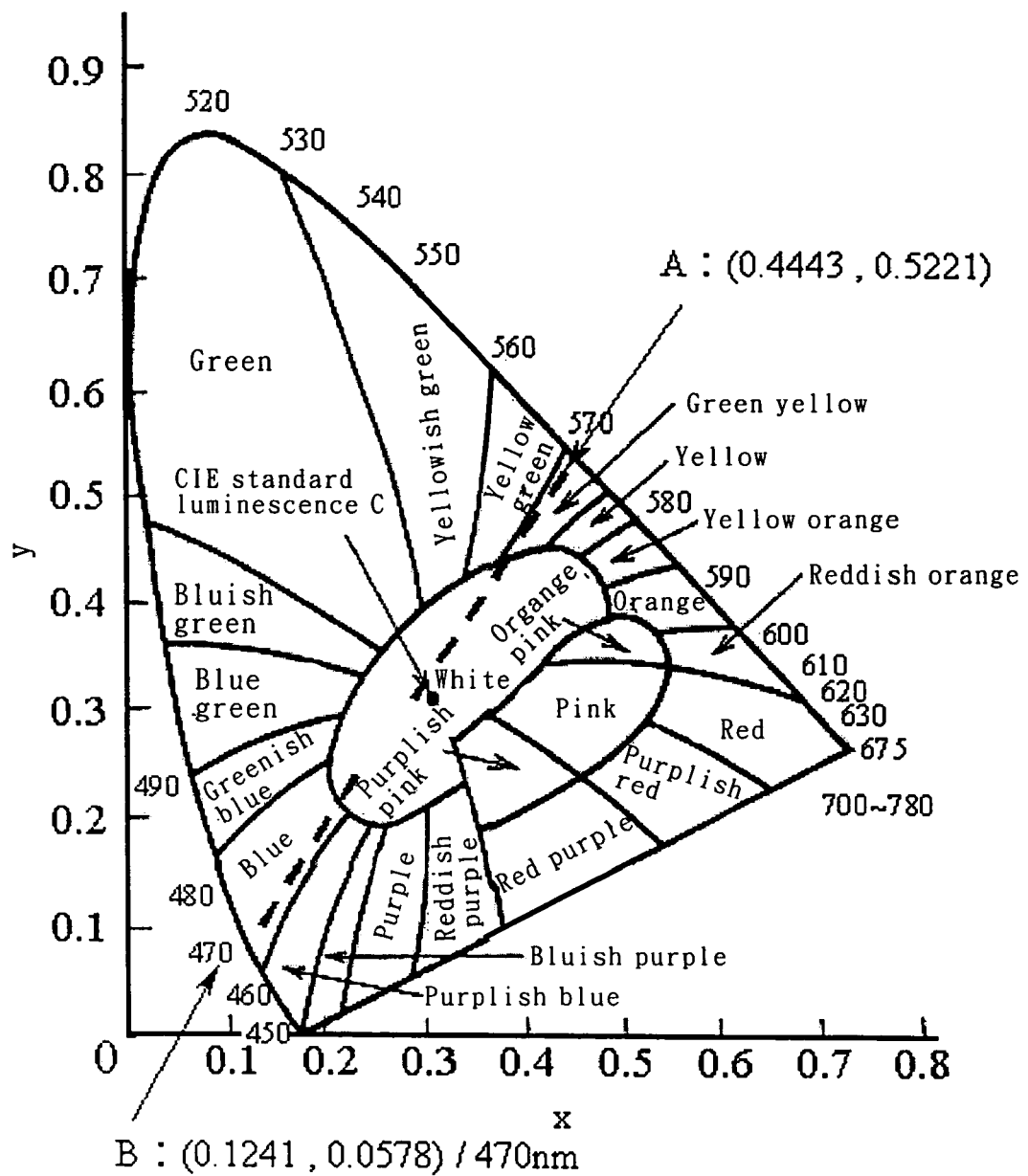
FIG. 3 is a chromaticity diagram, wherein a line passing through a chromatic coordinate A of the fluorescent material having an exciting spectrum shown in FIG. 2 and a chromatic coordinate B of the fluorescent material excited by a blue light with wavelength 470 nm passes through a white light area in the chromaticity diagram.

When using a blue light-emitting diode as the exciting light source and using the fluorescent material in accordance with the present invention, a white light with high brightness and high color evenness is obtained. The data of the spectrum of the fluorescent material in accordance with the present invention were converted by an equation of CIE (Commission International de l'Eclairage) chromaticity diagram prescribed by the CIE in 1931 into the chromatic coordinate of the fluorescent material. As illustrated in FIG. 3, a line passing through a chromatic coordinate A (0.4443, 0.5221) of the fluorescent material having an exciting spectrum shown in FIG. 2 and a chromatic coordinate B (0.1241, 0.0578) of the fluorescent material excited by a blue exciting light with wavelength 470 nm passes through a white light area in the chromaticity diagram.

As illustrated in FIG. 3, this is because when the visual nerve is simultaneously stimulated by a light with wavelength 470 nm and a light having a color between yellow and orange (point A), a vision of pure white light is obtained through mixing of the lights. Thus, the fluorescent material of a formula $(Tb_{2.755}Ce_{0.045}Gd_{0.2})Al_5O_{12}$) can be mixed with appropriate material in an appropriate ratio, and a blue light-emitting diode is used as the exciting light source. After packaging, a white light-emitting diode providing pure white lights can be obtained. The brightness and color evenness of the white light-emitting diode in accordance with the present invention are improved in comparison to those of a conventional white light-emitting diode using a fluorescent material into which only cerium is added. Further, the other desired chromatic coordinates can also be obtained.

Further, in the chemical synthetic methods (synchronous precipitation method and combustion method) in accordance with the present invention, a chelate compound of ammonium salts of metal in the form of gel is used as the precursor for sintering for the purpose of obtaining the crystalline metal oxide. In the heat processing of the precursor, the resultant crystal has high grain homogeneity and a small crystalline grain size, as the combustion process and the temperature change are slow and mild. Thus, the fluorescent material produced by the methods in accordance with the present invention possesses better lighting characteristics.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A fluorescent material of terbium aluminum garnet having a formula $(Tb_{3-x-y}Ce_xRe_y)Al_{5-z}Si_zO_{12}$, wherein $0<x\leq0.8$, $0<y\leq2.0$, $0<z\leq1.0$ and wherein Re is at least one of gadolinium (Gd), rubidium (Rb), thulium (Tm), praseodymium (Pr), samarium (Sm), europium (Eu), dysprosium (Dy), holmium (Ho), erbium (Er), ytterbium (Yb), lutetium (Lu), strontium (Sr), yttrium (Y), vanadium (V), and chromium (Cr).

2. The fluorescent material as claimed in claim 1, wherein the fluorescent material is excited by a light source having a wavelength between 430 nm and 490 nm.

* * * * *